(12) United States Patent
Winfield et al.

(10) Patent No.: US 7,555,548 B2
(45) Date of Patent: Jun. 30, 2009

(54) METHOD AND APPARATUS FOR EFFICIENT DATA COLLECTION

(75) Inventors: Colin P. Winfield, Ashburn, VA (US); Hubert R. Sieh, Herndon, VA (US); Ramin Ali Dousti, Ashburn, VA (US); Teh Pao Liu, Fairfax, VA (US); Shobha Singh, Ashburn, VA (US); Hewad Benawa, Boyce, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1147 days.

(21) Appl. No.: 10/819,296

(22) Filed: Apr. 7, 2004

(65) Prior Publication Data
US 2005/0228885 A1    Oct. 13, 2005

(51) Int. Cl.
*G06F 15/173* (2006.01)
(52) U.S. Cl. .................. 709/224; 709/223; 709/220
(58) Field of Classification Search ................ 709/224, 709/223, 220, 217
See application file for complete search history.

(56) References Cited
U.S. PATENT DOCUMENTS

| | | | | |
|---|---|---|---|---|
| 6,108,800 A * | 8/2000 | Asawa | ........................ | 714/47 |
| 6,182,022 B1 * | 1/2001 | Mayle et al. | ................. | 702/182 |
| 6,437,692 B1 * | 8/2002 | Petite et al. | .................. | 340/540 |
| 6,973,034 B1 * | 12/2005 | Natarajan et al. | ........... | 370/232 |
| 7,116,643 B2 * | 10/2006 | Huang et al. | ................. | 370/255 |
| 2003/0126256 A1 * | 7/2003 | Cruickshank et al. | ....... | 709/224 |
| 2004/0054680 A1 * | 3/2004 | Kelley et al. | ................. | 707/100 |
| 2005/0228885 A1 * | 10/2005 | Winfield et al. | ............. | 709/224 |

* cited by examiner

*Primary Examiner*—Philip B Tran (57) ABSTRACT

A method and apparatuses are provided for data collection from network elements in a network. A collector sends a data request to one of the network elements. The collector determines whether a condition exists regarding the network element. When the collector determines that the condition exists, the collector stops the data collection from the network element without affecting the data collection by the collector from other network elements, the data collection remains stopped until the collector is notified that the condition no longer exists, and the collector sends a message to the validator to inform the validator of the condition. In another aspect, a validator is informed of a configuration change of one of a group of network elements. The validator requests at least a portion of configuration information of the network element, determines optimum configuration parameters for data collection, and sends the optimum configuration parameters to a collector.

20 Claims, 6 Drawing Sheets

METHOD AND APPARATUS FOR EFFICIENT DATA COLLECTION

TECHNICAL FIELD

The invention pertains to computer networks. In particular, the invention pertains to efficient data collection in a network.

BACKGROUND OF THE INVENTION

Performance metrics may be collected from network elements in a network for a variety of reasons. For example, performance metrics may be collected and processed to determine whether a network provider is providing a certain level of service, such as a level stated in a Service Level Agreement (SLA).

Figure 1:
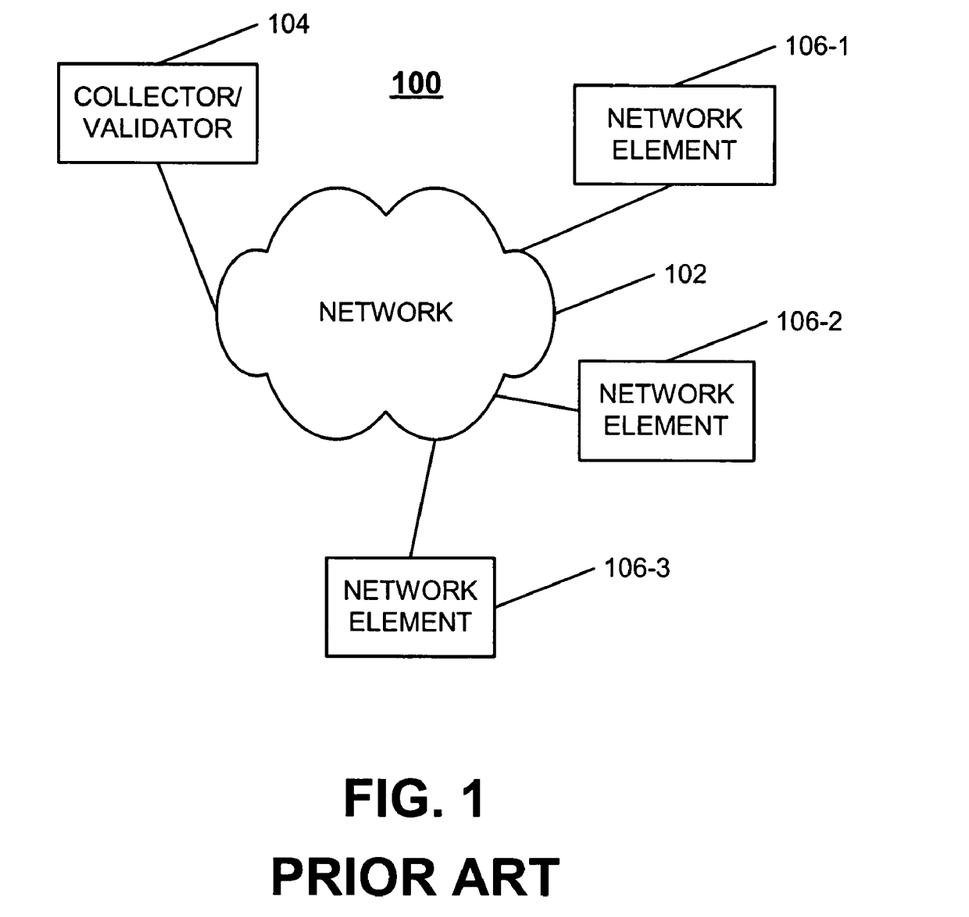
FIG. 1 depicts an existing system for collecting data from network elements.

FIG. 1 illustrates an exemplary existing system 100 including a network 102, a collector/validator 104 and network elements 106-1, 106-2, 106-3 (collectively referred to as network elements 106) connected to network 102. Collector/validator 104 may request performance metrics from network elements 106. Network elements 106 may be network devices including, for example, host computers, routers, and network nodes. Collector/validator 104 may use the well-known Simple Network Management Protocol (SNMP) to request and receive the metrics from the network elements 106.

FIG. 1 is an exemplary existing system and may include more or fewer items than illustrated. For example, system 100 may include multiple collector/validators 104, each collecting performance metrics from a subset of the group of network elements 106.

In addition to being responsible for collecting data, such as performance metrics, collector/validator 104 may be responsible for performing other functions, such as validating a configuration change and reestablishing contact with network elements. While collecting performance metrics, if collector/validator 104 cannot establish contact with a network element, collector/validator 104 may attempt to reestablish contact numerous times until the contact is established. Because collection functions, configuration validation functions and contact reestablishment functions of collector/validator 104 share processing resources, collector/validator's 104 configuration validation functions and contact reestablishment functions, in a large network, may have an adverse effect on the collection functions. Thus, in a large network with many configuration changes and frequent loss of contact with network elements 106, uncollected performance metrics may accumulate at network elements 106. When collector/validator 104 is unable to collect the performance metrics from network elements 106 due to inability to contact network elements 106 or time spent performing other functions, network element 106 may use limited storage space or memory to store accumulating performance metrics. Consequently, the longer a time period in which performance metrics are uncollected from a network element 106, the greater the probability of losing performance metric data accumulating in network elements 106.

When collector/validator 104 is in a successful steady state and is in the process of collecting performance metrics from network elements 106, using a protocol, such as, for example, SNMP, collector/validator 104 may spend approximately 100 milliseconds (ms) collecting the performance metrics from each of the network elements 106. Of the 100 ms of the collection processing for each network element 106, collector/validator 104 may spend at least 95% of that time requesting the performance metrics. In small networks, overhead associated with a relatively small number of network elements 106 may be negligible. However, in a large network, for example, a network with at least approximately 10,000 nodes, the above-mentioned problems make it necessary to include a number of collector/validators 104 in a network. A more efficient method of collecting performance statistics is needed to decrease the impact of an inability to contact network elements 106 and configuration changes and to decrease the amount of resources, for example, a number of collector/validators 104, needed to collect the performance metrics from network elements 106 in a large network.

SUMMARY OF THE INVENTION

In a first aspect of the invention, a method is provided for collecting data in a network including a group of network elements, a collector and a validator. In the method, the collector sends a data request to one of the network elements. The collector determines whether a condition exists regarding the one of the network elements. When the collector determines that the condition exists, the collector stops data collection from the one of the network elements without affecting data collection by the collector from other ones of the network elements. The data collection remains stopped until the collector is notified that the condition no longer exists and the collector sends a message to the validator to inform the validator of the condition.

In a second aspect of the invention, a validator is provided. The validator includes a memory, including a group of instructions, and a processor. The processor is configured to execute the instructions to receive an indication from a collector of a condition pertaining to one of the network elements in a network, resolve a problem associated with the condition, and inform the collector that the problem associated with the condition is resolved.

In a third aspect of the invention, a collector is provided for collecting performance data from a group of network elements in a network. The collector includes a memory, including a group of instructions, and a processor. The processor is configured to execute the instructions to send a performance data request to each one of the network elements, receive a performance data response from each of the network elements, and determine whether a condition exists regarding one of the network elements. When the processor determines that the condition exists, the processor is further configured to stop sending of the performance data request to the one of the network elements without affecting sending of the performance data request to others of the network elements, and resume sending of the performance data request to the one of the network elements after being informed that the condition is resolved.

In a fourth aspect of the invention, a validator is provided. The validator includes a memory, including a group of instructions, and a processor. The processor is configured to execute the group of instructions to receive an indication of a configuration change pertaining to one of a group of network elements in a network, request and receive at least a portion of configuration information of the network element, determine optimum configuration parameters for collecting performance data from the network element, and send the optimum configuration parameters to a collector for collecting the performance data from the network elements.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

As described herein, the collection of data, such as performance metrics, is separated from other network activities, such as contact reestablishment and validation of network element configuration changes. By separating these activities, such as frequent contact reestablishment and validation of network element configuration changes, as may occur in a large network, will not adversely affect the collection of data from unaffected network elements.

Exemplary System

Figure 2:
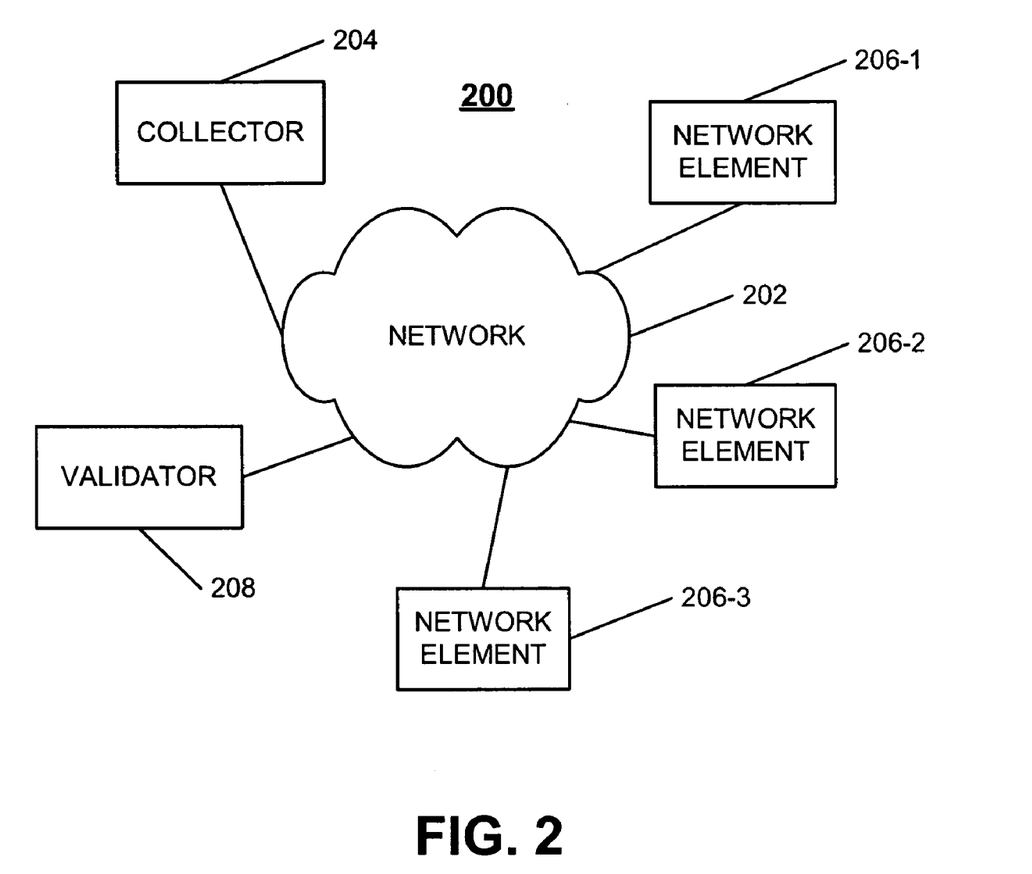
FIG. 2 depicts an exemplary system, consistent with principles of the invention, for collecting data from network elements.

FIG. 2 depicts an exemplary system 200 consistent with the principles of the invention. System 200 includes a network 202, a collector 204, network elements 206-1, 206-2, 206-3 (collectively referred to as 206), and a validator 208. Collector 204, network elements 206 and validator 208 are connected to network 202. Collector 204 is responsible for collecting data, for example, performance metrics from a group of network elements 206 via network 202. Collector 204 may request and receive the performance metrics from each of the network elements 206 by using the well-known SNMP protocol, or a similar protocol. Validator 208 is responsible for validating configuration changes and for reestablishing contact with network elements 206. Collector 204 and validator 208 may be in separate physical devices or may be in one physical device in which validator 208 and collector 204 operate independently. That is, performance of validator 208 has no effect on collector 204 and vice versa.

FIG. 2 is an exemplary system and may include more or fewer items than illustrated. For example, system 200 may include multiple collectors 204, each collecting performance metrics from a subset of the group of network elements 206, or system 200 may include multiple validators 208, each associated with one or more collectors 204.

Figure 3:
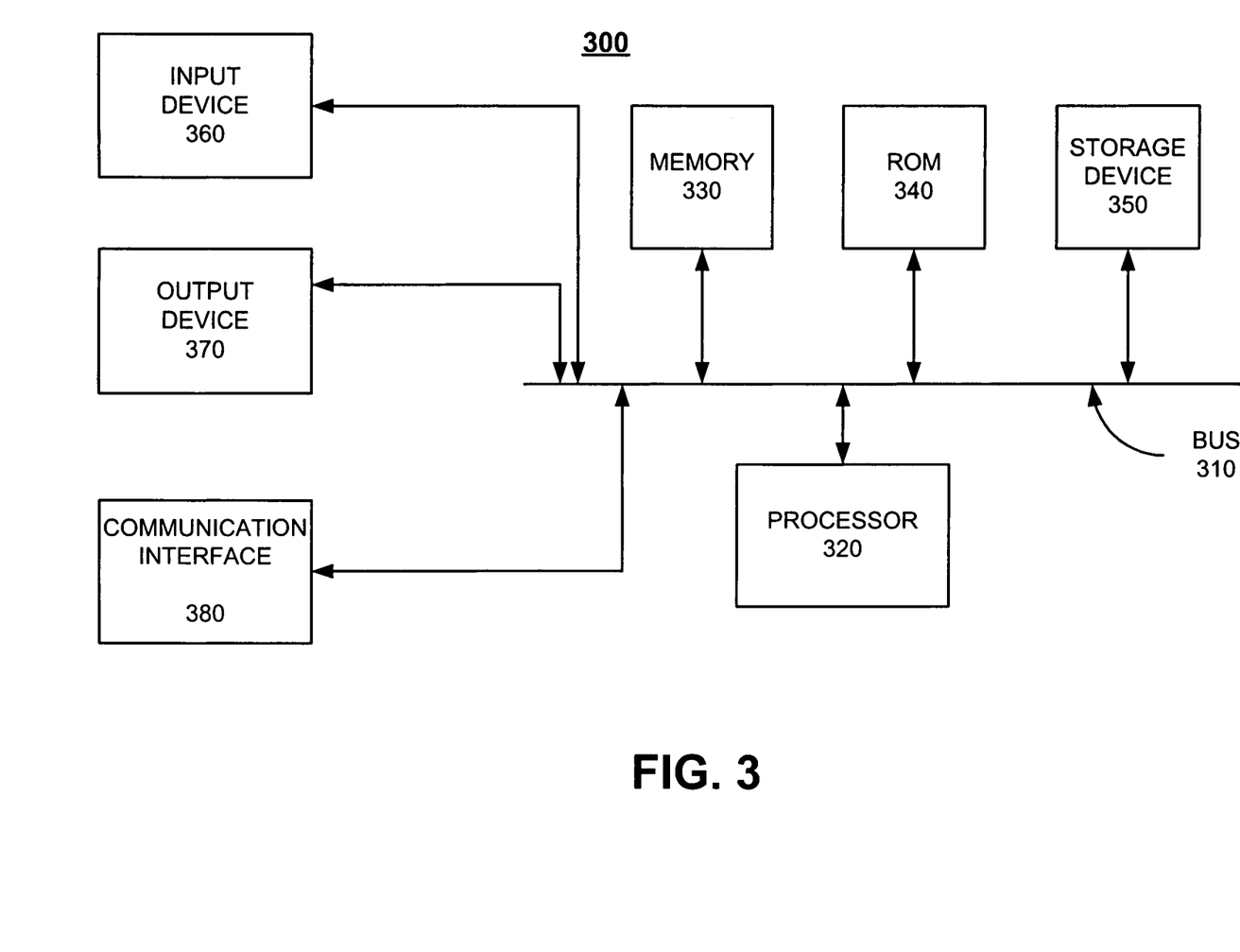
FIG. 3 illustrates a detailed view of an exemplary apparatus that may be used as a collector, a validator, and a network element in implementations consistent with the principles of the invention.

FIG. 3 illustrates a detailed view of a device 300 that may be configured as collector 204, validator 208, or as one of the group of network elements 206. Device 300 may include a bus 310, a processor 320, a memory 330, a read only memory (ROM) 340, a storage device 350, an input device 360, an output device 370, and a communication interface 380. Bus 310 permits communication among the components of device 300.

Processor 320 may include one or more conventional processors or microprocessors that interpret and execute instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of magnetic or optical recording medium and its corresponding drive, such as a magnetic disk or optical disk and its corresponding disk drive.

Input device 360 may include mechanisms that permit a user to input information to system 100, such a keyboard, a mouse, a pen, a biometric mechanism, such as a voice recognition device, etc. Output device 370 may include mechanisms that output information to the user, including a display, a printer, one or more speakers, etc. Communication interface 380 may include any transceiver-like mechanism that enables device 300 to communicate via a network. For example, communication interface 180 may include a modem or an Ethernet interface for communicating via network 202. Alternatively, communication interface 380 may include other mechanisms for communicating with other networked devices and/or systems via wired, wireless or optical connections.

Device 300 may perform functions in response to processor 320 executing sequences of instructions contained in a computer-readable medium, such as memory 330. A computer-readable medium may include one or more memory devices and/or carrier waves. Such instructions may be read into memory 330 from another computer-readable medium, such as storage device 350, or from a separate device via communication interface 380.

Execution of the sequences of instructions contained in memory 330 may cause processor 320 to perform certain acts that will be described hereafter. In alternative implementations, hard-wired circuitry may be used in place of or in combination with software instructions to implement the present invention. Thus, the present invention is not limited to any specific combination of hardware circuitry and software. In one implementation, device 300, configured as collector 204, may be implemented on a NETRA T 1125 computer with twin processors, executing the SOLARIS 2.8 operating system, available from SUN Microsystems.

Determination of Optimum Protocol Data Unit and Optimal Sampling Period

While in a successful steady state (i.e. a state in which data collection occurs successfully, no loss of contact with network elements 206 occur and no configuration changes of network elements 206 occur), collector 204 may spend a significant amount of time performing network I/O when collecting performance metrics from network elements 206. Therefore, performance of collector 204 may be improved by minimizing the number of collection requests made in any given period within constraints of statistical requirements, counter sizes, performance history depth, etc.

A protocol data unit (PDU) is a message of a given protocol that may include payload and protocol-specific control information, typically contained in a header. In implementations consistent with the principles of the invention, the SNMP protocol, or a similar protocol may be used to collect performance metrics. Thus, in some implementations consistent with the principles of the invention, a PDU may be a SNMP protocol message.

Figure 4:
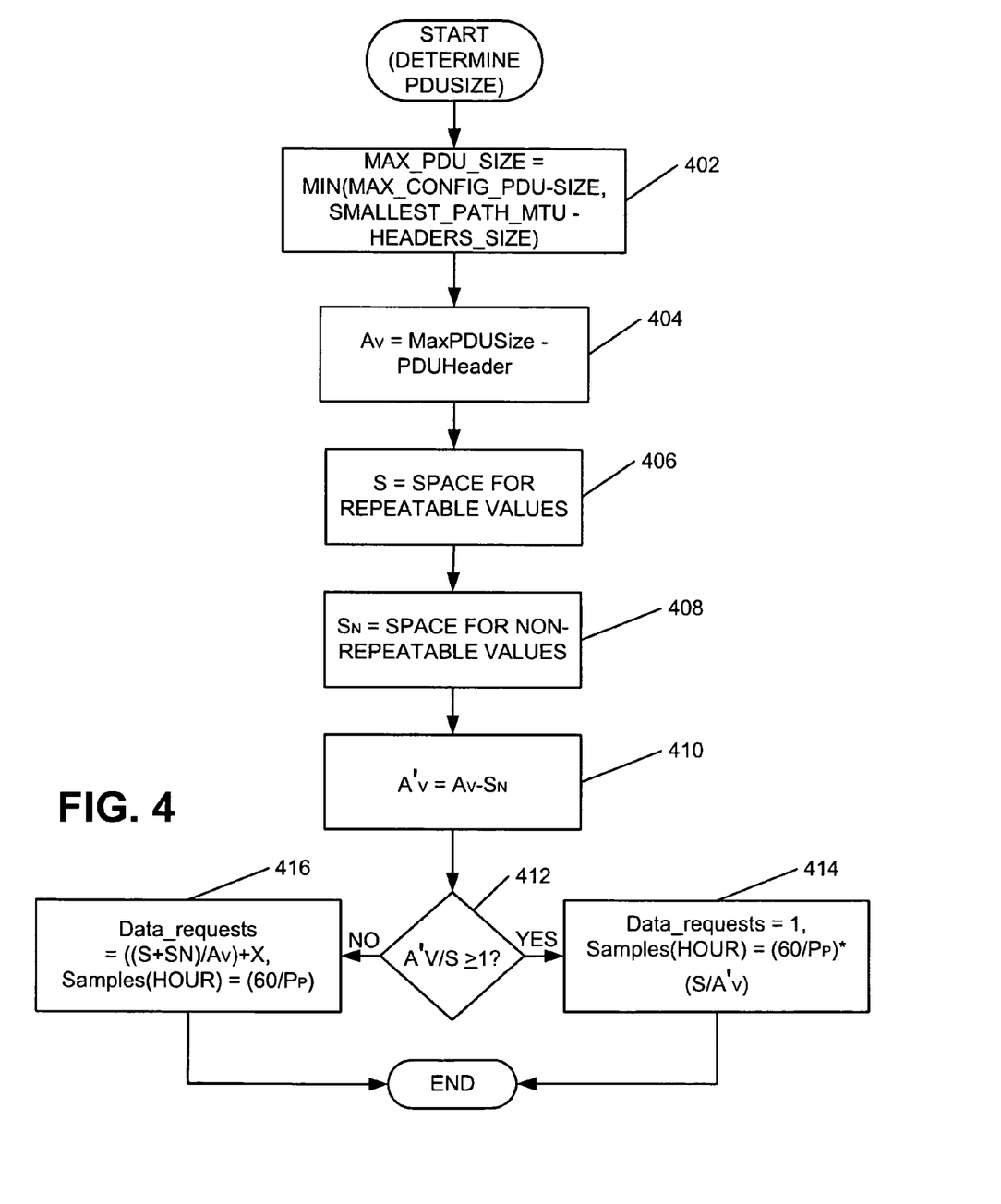
FIG. 4 is a flowchart that illustrates an exemplary process for a validator consistent with the principles of the invention.

FIG. 4 is a flowchart that helps to explain a process of determining an optimum PDU size and an optimum sampling period for data collection from a network element. In implementations consistent with the principles of the invention, validator 208 may perform the process when validating a configuration and may reconfigure collector 204 to efficiently collect the performance metrics from the one of network elements 206. This will be discussed in more detail below.

Consistent with the principles of the invention, a request for performance metrics and a response including the performance metrics may be included in a PDU within an Internet Protocol (IP) datagram. IP fragmentation occurs when the IP datagram exceeds a length of a Maximum Transmission Unit (MTU) for an interface over which the datagram is about to be transmitted. An MTU is a parameter that determines a largest datagram than can be transmitted via an IP interface without performing IP fragmentation. When a datagram is fragmented, it is not reassembled until it reaches its final destination. Collector 204 of system 200 may reassemble received performance metrics included in fragmented IP datagrams. This is of a particular concern when network element 206 is, for example, a Virtual Private Network (VPN) node, connected to network 202 over a Digital Subscriber Line (DSL), which may have a significantly smaller MTU than a T1 connection. Therefore, in system 200, when validator 208 is validating a configuration change of one of a group of network elements 206, validator 208 may determine the maximum or optimum PDU size for collector 204 to use when collecting the performance metrics from the one of network elements 206 to be a minimum of a maximum PDU size configured for the one of network elements 206 and a smallest MTU (less headers (e.g., IP header and User Datagram Protocol (UDP) header) within a path between collector 204 and the one of network elements 206 (act 402).

Once the maximum PDU size is determined, validator 208 may determine an optimum sampling period. The sampling period for one of network elements 206 is a time period between collection of metrics from one of network elements 206 by collector 204. Validator 208 may begin by calculating the amount of PDU space, $A_V$, available for performance metrics by subtracting a size of the PDU header from the maximum PDU size (act 404), as stated in the following formula:

$$A_V = \text{Max}PDU\text{Size} - PDU\text{Header} \quad \text{(Eq. 1)}$$

Typically, at least some of the requested performance metrics may be non-repeatable values, such as, for example, systemUpTime, which indicates an amount of time that the system is up, while other performance metrics may be repeatable, such as performance metrics history data, for example, HistoryCollectionCompletionTime, which indicates the time to complete a most current history collection. Let $C_n$ be a count of required non-repeatable values, $C_h$ be a count of repeatable data, for example, history data, and $C_t$ be a count of a number of sets of performance metrics, for example, $C_t$ may be a number of tunnels associated with one of the network elements 206, where a tunnel is a secure encrypted connection between two points via a public or third party network. $C_t$ may also be, for example, a number of interfaces upon which one of the network elements 206 tracks performance metrics. Validator 208 may calculate an amount of space, S, required for repeatable performance metrics (act 408). In implementations that use the SNMP protocol, responses may include variable names and variable values. Therefore, in such implementations, validator 208 may calculate the amount of required space for repeatable data, S, using the following formula:

$$S = C_t \times \left( \sum_{i=1}^{C_h} N_i + \sum_{i=1}^{C_h} V_i \right) \quad \text{(Eq. 2)}$$

where $N_i$ is a length of an $i_{th}$ variable name and $V_i$ is a length of the $i_{th}$ variable value.

Next, validator 208 may calculate an amount of space, $S_N$, required for non-repeatable performance metrics (act 408). In implementations that use the SNMP protocol, validator 208 may calculate an amount of space needed for non-repeatable data, $S_N$, using the following formula:

$$S_N = \left( \sum_{i=1}^{C_n} N'_i + \sum_{i=1}^{C_n} V'_i \right) \quad \text{(Eq. 3)}$$

where $N'_i$ is a length of an $i_{th}$ non-repeatable variable name and $V'_i$ is a length of the $i_{th}$ non-repeatable variable value.

Next, validator 208 may calculate the total available PDU space needed for repeatable performance metrics, $A'_V$, by subtracting the space required for non-repeatable data from total available PDU space (act 410). $A'_V$ may be determined according to the following formula:

$$A'_V = A_V - S_N \quad \text{(Eq. 4)}$$

Validator 208 may perform a calculation to determine whether multiple sets of repeatable performance metrics data may be included in a request for metrics from collector 204 to one of network elements 206 (act 412). If $$A'_V / S \geq 1 \quad \text{(Eq. 5)}$$

then collector 204 may collect multiple repeatable performance metric sets in one data request (one data request includes requests for multiple sets of repeatable performance metrics, Data_requests=1) and the optimal number of requests per hour may be determined (act 414) according to the following formula:

$$\text{Samples(hour)} = (60/P_p) \times (S/A'_V) \quad \text{(Eq. 6)}$$

where $P_p$ is a frequency at which unique performance metrics are generated. For example, $P_p$ may be a probing latency metric for a VPN node tunnel. $P_p$ may be set to, for example, 5 minutes.

A Management Information Base (MIB) is a database of network management information that is used and maintained by a network management protocol, such as SNMP. The SNMP GetNext operation commands an SNMP agent on a host to get the value of the next object in the MIB. The SNMP GetBulk operation has at least one object identifier as an argument and queries a network entity efficiently for information. The non-repeaters field in the GetBulk PDU specifies the number of supplied variables that should not be iterated over. The max-repetitions field in the GetBulk PDU specifies the maximum number of iterations over the repeating variables. In an implementation in which collector 204 requests and receives performance metrics from network elements 206 via the SNMP protocol, SNMP GetNext or SNMP GetBulk may be used with a repetition count of 1 for non-repeatable values and a repetition count equal to the integer portion of a result of $$A'_V / S.$$

If $$A'_V / S < 1,$$

then an amount of performance metric data generated by one of the network elements 206 during a sample period exceeds an amount of available PDU space. Therefore, multiple collection requests may be made by collector 204 to one of the network elements 206 during a sampling period. In an implementation in which collector 204 uses the SNMP protocol to collect performance metrics from a particular one of the network elements 206, validator 208 may calculate the number of SNMP data collection requests per sampling period, Data_requests, (act 416) according to the formula:

$$\text{Data\_requests} = ((S + S_N)/A_V) + x \qquad \text{(eq. 7)}$$

where x takes into account space needed for variable name/value pairs to be included in a same SNMP PDU. The first request from collector 204 may include non-repeatable values and as many repeatable values as may fit in the remaining PDU space. Subsequent requests from collector 204, for a particular sampling, may exclude prior collected variables. Validator 208 may calculate a total number of sampling periods per hour, Samples(hour), (act 416) as follows:

$$\text{Samples(hour)} = (60/P_P) \qquad \text{(eq. 8)}$$

Exemplary Collector Processing

Figure 5:
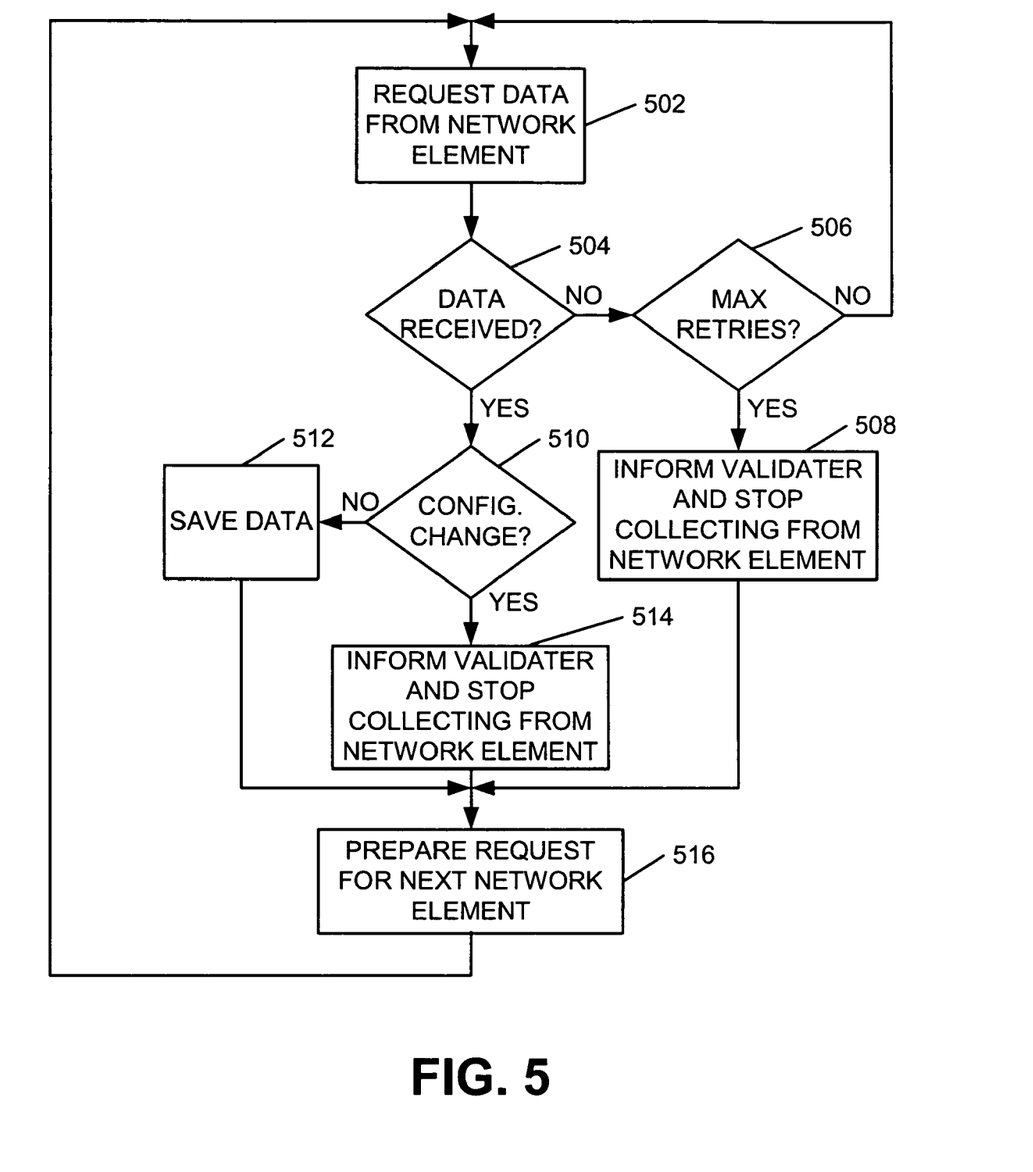
FIG. 5 is a flowchart that illustrates an exemplary process for a collector consistent with the principles of the invention.

FIG. 5 is a flowchart that illustrates exemplary processing in collector 204 consistent with the principles of the invention. Collector 204 may begin by determining that it is time to collect samples (request performance metrics) from one of the network elements 206. Collector 206 may then request the performance metrics from the network element 206 (act 502). A single set of performance metrics or multiple sets of performance metrics may be requested, as previously discussed with reference to acts 414 and 416 of FIG. 4.

After waiting no more than a predetermined time period, collector 204 may determine whether the requested metrics were received (act 504). If the requested metrics were not received, collector 204 may determine whether a number of attempts to collect data from the one of network elements 206 is equal to a predetermined maximum number of retries (act 506). In some implementations consistent with the principles of the invention, the number of retries may be, for example, three. If the number of attempts to collect the metrics from the one of network elements 206 does not equal the maximum number of retries, then collector 204 may again request the metrics from the one of the network elements (act 502). If the number of attempts to collect the metrics equals the maximum number of retries, then collector 204 may send a message to validator 208 to inform validator 208 that collector 204 is unable to contact the one of network elements 206 and collector 204 may remove the one of network elements 206 from a list of network elements 206 from which collector 204 is to collect the metrics (act 508).

If the metrics are received, the metrics may include an indication of a configuration change. The indication may include, for example, one or more changed indices or configuration timestamps. If collector 204 determines that the metrics do not include the indication of a configuration change (act 510), then collector 204 may save the collected metrics to a file (act 512).

If collector 204 determines that a configuration change has occurred (act 510), then collector 204 may remove the one of the network elements 206 from its list of network elements from which to collect the metrics and collector 204 may send a message to validator 208 informing validator 208 to validate the configuration change of the network element 206 (act 514).

Collector 204 may then prepare a request for metrics from a next network element 206 according to collector's 204 list of network elements 206 from which to collect metrics (act 516). Collector 204 may re-perform acts 502-516 for the next network element 206. At some time in the future, validator 206 may reestablish contact with a network element 206 or validator 208 may complete validating a configuration change for a network element 206. When either reestablished contact occurs or a validated configuration change occurs, validator 208 may send a message to collector 204 informing collector 204 of the reestablished contact or the validated configuration change. Upon receiving the message from validator 208, collector 204 may add the network element 206 to collector's 204 list of network elements from which to collect metrics, such that the network element 206 will eventually receive a data request from collector 204.

Exemplary Validator Processing

Figure 6:
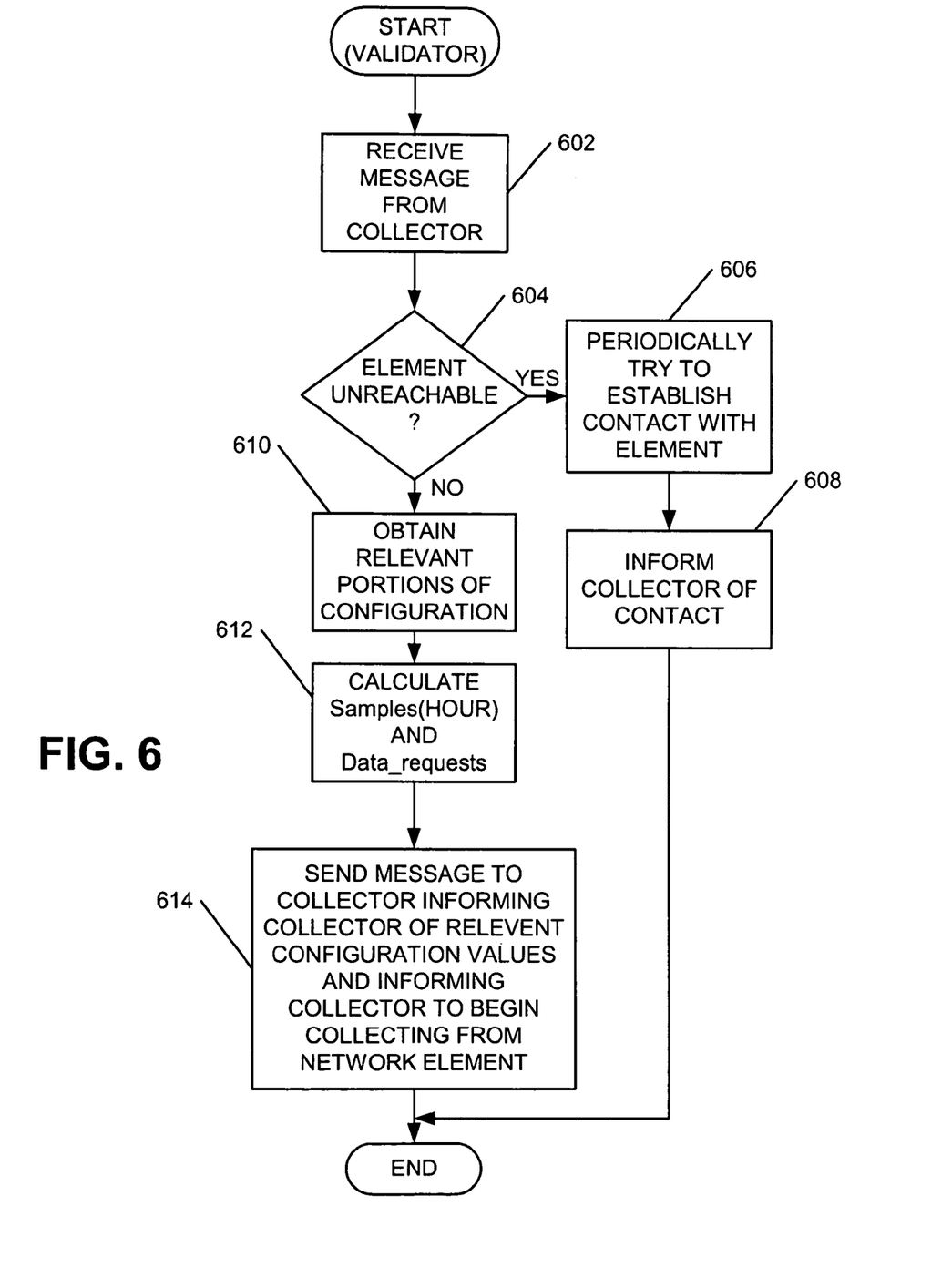
FIG. 6 is a flowchart that illustrates another exemplary process for a validator consistent with the principles of the invention.

FIG. 6 is a flowchart that illustrates exemplary processing performed by validator 208 for one of the group of network elements 206 in implementations consistent with the principles of the invention.

Processing may begin with validator 208 receiving a message from collector 204 (act 602). Validator 208 may check the message to determine whether the message indicates that collector 204 is unable to reach a network element 206 (act 604). If validator 208 determines that the message indicates that the network element 206 is unreachable, then validator 208 may periodically attempt to establish contact with the network element 206. When contact is established, validator 208 may send a message to collector 204 to inform collector 204 that the network element 206 is now reachable (act 608). Ideally, validator 208 should be located such that a probability of contacting network elements 206 from validator 206 is the same as a probability of contacting network elements 206 from collector 204. Otherwise, validator 208 may report contact established and collector 204 may immediately report an inability to contact. The repeating of the reporting of the contact established and the inability to contact sent from validator 208 to collector 204 may adversely affect collection performance of collector 204.

When validator 208 determines that the message received from collector 204 does not indicate that a particular one of network elements 206 is unreachable, validator 208 may assume that the message indicates that a configuration change has occurred. Validator 208 may then obtain relevant portions of a configuration from the network element 206 or from a configuration management server (act 610). In implementations in which validator 208, collector, 204 and network elements 206 communicate via the SNMP protocol or a similar protocol, validator 208 may request the relevant configuration information via the protocol. For example, validator 208 may request information regarding, for example, maximum configured PDU size at one of network elements 206, MTU sizes along paths between collector 204 and the network element 206, frequency, $P_p$, at which the network element 206 generates performance metrics, count of repeatable data, length of repeatable variable names, length of repeatable variable values, length of non-repeatable variable names, length of non-repeatable variable values, and a number of sets of performance metrics, $C_f$, associated with the network element 206.

If validator 208 is unable to obtain the relevant portions of the configuration, which may be due to an invalid network element configuration, validator 208 may provide a warning. The warning may be, for example, a message on a display or in a report, an e-mail message sent to a system administrator, or any other method of providing a warning.

After obtaining the relevant configuration information, validator 208, may calculate sampling period, samples(hour), and a number of collection requests per sample, Data_requests (act 612). Validator 208 may perform the calculations as described previously (acts 402-416: FIG. 4).

Validator 208 may then send a message, using SNMP or a similar protocol, to collector 204, to inform collector 204 that configuration validation is complete for the network element 206 and to inform collector 204 of any relevant changes, such as, for example, a change in number of requests per sample, a change in PDUSize, a change in sampling time, a change in number of tunnels, etc. (act 614).

When collector 204 receives the message indicating the completion of validation from validator 208, collector 204 may change relevant configuration parameters pertaining to collection from the network element 206, for example, sampling time, PDUSize, number of requests per sample, etc. and may add the network element 206 to the list of network elements 206 from which collector 204 is to collect metrics. Similarly, when collector 204 receives a contact established message for one of the network elements 206 from validator 208, collector 204 may add the network element 206 to the list of network elements 206 from which collector 204 is to collect metrics.

CONCLUSION

Removing non-collection activities, such as configuration validation and contact reestablishment, from a collector minimizes the performance impact on data collection when numerous network elements become unreachable and when configuration changes of network elements occur. In an existing system with about 10,000 network elements, seven collector/validators, each having twin CPU hosts, collected metrics from the network elements at 30-minute intervals. After implementing an embodiment consistent with the principles of the invention, a single twin CPU host collector was able to collect metrics from about 10,000 network elements at ten minute sampling intervals.

The foregoing description of the preferred embodiments of the present invention are provided for illustration and description, but is not intended to be limiting or to limit the invention to the precise form disclosed. Modifications and variations are possible in light of the above teachings or may be acquired from practice of the invention. For example, while series of acts have been described with regard to FIGS. 4-6, the order of the acts may differ in other implementations consistent with the present invention. Also, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for collecting data in a network comprising a plurality of network elements, a collector, and a validator, the method comprising:
   sending a data request from the collector to one of the plurality of network elements;
   determining, by the collector, whether a condition exists regarding the one of the network elements;
   stopping, by the collector, data collection from the one of the plurality of network elements, when the determining determines that the condition exists, without affecting data collection by the collector from other ones of the plurality of network elements, the stopping continuing until the collector is notified that the condition no longer exists, and
   sending a message, from the collector to the validator, to inform the validator of the condition.

2. The method of claim 1, further comprising:
   receiving the message by the validator;
   resolving, by the validator, the condition;
   sending a second message, from the validator to the collector, informing the collector that the condition is resolved; and
   receiving the second message by the collector and scheduling, by the collector, a data collection from the one of the plurality of network elements.

3. The method of claim 1, where the message is a Simple Network Management Protocol message.

4. The method of claim 1, where the condition is one of a configuration change of the one of the plurality of network elements or an inability to contact the one of the plurality of network elements.

5. The method of claim 1, further comprising:
   receiving, at the validator, the message from the collector informing the validator of the condition, the condition being a configuration change of the one of the plurality of network elements;
   in response to the receiving the message, performing at the validator:
      sending one or more requests for at least a portion of configuration information pertaining to the one of the plurality of network elements,
      receiving the at least a portion of the configuration information, determining a maximum data unit size that can be sent on a path between the collector and the one of the network elements without fragmentation of the data unit, determining a frequency of collection of the data from the one of the network elements;

determining a number of data requests to send to the one of the network elements at a sampling time; and sending to the collector information informing the collector that the condition no longer exists, the information including the maximum data unit size, the frequency of collection of the data, and the number of data requests to send to the one of the network elements at the sampling time.

6. The method of claim 1, further comprising:

receiving, at the validator, the message from the collector informing the validator of the condition, the condition being an inability to contact the one of the plurality of network elements;

in response to the receiving the message, performing at the validator:

periodically attempting to reestablish contact with the one of the plurality of network elements, and when the contact with the one of the plurality of network elements is reestablished, sending a second message to the collector informing the connector that the condition no longer exists.

7. The method of claim 6, where a probability that the validator can successfully contact the one of the plurality of network elements is equal to a probability that the collector can successfully contact the one of the plurality of network elements.

8. A validator comprising:

a memory including a plurality of instructions; and a processor to execute the plurality of instructions to:

receive an indication from a collector of a condition pertaining to one of a plurality of network elements in a network, the collector operating independently from the validator, resolve a problem associated with the condition, and inform the collector that the problem associated with the condition is resolved.

9. The validator of claim 8, where the condition includes one of a configuration change of the one of the plurality of network elements or an inability to contact the one of the plurality of network elements.

10. The validator of claim 8, where:

the condition is an inability to contact the one of the plurality of network elements, and when the validator resolves the problem associated with the condition, the validator is configured to:

attempt to establish contact with the one of the plurality of network elements, when the attempt is unsuccessful, repeat the attempt, and when the attempt is successful, inform the collector that the problem associated with the condition is resolved.

11. A collector for collecting performance data from a plurality of network elements in a network, the collector comprising:

a memory including a plurality of instructions; and a processor to execute the plurality of instructions to:

send a performance data request to each one of the plurality of network elements, receive a performance data response from each one of the plurality of network elements in response to the performance data request, and determine whether a condition exists regarding one of the network elements, when the condition is determined to exist, the processor is further configured to:

stop sending of the performance data request to the one of the plurality of network elements without affecting sending of the performance data request to others of the plurality of network elements, send a message to a validator informing the validator of the condition, the validator operating independently from the collector, receive a second message from the validator informing that the condition has been resolved, and resume sending of the performance data request to the one of the plurality of network elements after being informed that the condition is resolved.

12. The collector of claim 11, where the performance data request and the performance data response ire Simple Network Management Protocol messages.

13. The collector of claim 11, where the condition includes one of a configuration change or an inability to contact the one of the plurality of network elements.

14. The collector of claim 11, where:

the condition includes a configuration change regarding the one of the plurality of network elements, when the collector is informed that the condition is resolved, the collector changes configuration parameters pertaining to the one of the plurality of network elements, such that a size of a PDU is optimum, within constraints of the system, for collecting the performance data from the one of the plurality of network elements.

15. A validator comprising:

a memory including a plurality of instructions; and a processor to execute the plurality of instructions to:

receive an indication of a configuration change pertaining to one of a plurality of network elements in a network from a collector that operates independently from the validator, request and receive at least a portion of configuration information of the one of the plurality of network elements, determine optimum configuration parameters for collecting performance data from the one of the plurality of network elements, and send the optimum configuration parameters to a collector for collecting the performance data from the one of the plurality of network elements.

16. The validator of claim 15, where the optimum configuration parameters include at least one item from a group comprising an optimum Protocol Data Unit size for communication with the one of the plurality of network elements, a frequency of collection of the performance data, and a number of data requests to send to the one of the plurality of network elements during each sampling time.

17. The validator of claim 15, where when the processor determines the optimum configuration parameters for collecting performance data from the one of the plurality of network elements, the processor is further configured to determine an optimum Protocol Data Unit Size for collecting the performance data by:

determining a maximum Protocol Data Unit size configured for the one of the plurality of network elements, determining a smallest Maximum Transmission Unit in a path between the collector and the one of the plurality of network elements, and determining the optimum Protocol Data Unit to be a minimum of the maximum Protocol Data Unit size configured for the one of the plurality of network elements and the smallest Maximum Transmission Unit in the path between the collector and the one of the plurality of network elements.

18. The validator of claim 17, where when the processor determines the optimum configuration parameters for collecting the performance data from the one of the plurality of network elements, the processor is further configured to:
   determine an optimum Protocol Data Unit size for collecting the performance data,
   determine an amount of available Protocol Data Unit space,
   determine a maximum amount of the performance data that the Protocol Data Unit can hold, and
   determine an amount of the performance data to request from the one of the plurality of network elements based on the maximum amount of the performance data that the Protocol Data unit can hold.

19. The validator of claim 18, where when the processor determines the optimum configuration parameters for collecting the performance data from the one of the plurality of network elements, the validator is further configured to:
   determine a time interval between sampling times, and
   determine a number of data requests to send at each of the sampling times.

20. The validator of claim 15, where the processor is further configured to execute the plurality of instructions to:
   receive an indication from the collector of an inability to contact the one of the plurality of network elements,
   attempt to establish contact with the one of the plurality of network elements,
   when the attempt is unsuccessful, repeat the attempt, and
   when the attempt is successful, inform the collector that the problem associated with the condition is resolved.

* * * * *